United States Patent [19]

Juric

[11] 4,411,570
[45] Oct. 25, 1983

[54] TAMPER-PROOF FASTENER

[76] Inventor: Ilija Juric, c/o William Bayley Company, 1200 Warder St., Springfield, Ohio 45503

[21] Appl. No.: 251,607

[22] Filed: Apr. 6, 1981

[51] Int. Cl.³ .............................................. F16B 13/04
[52] U.S. Cl. ..................... 411/271; 411/44; 411/57; 411/75; 411/333
[58] Field of Search ....................... 411/39, 40, 41, 42, 411/44, 45, 52, 59, 60, 62, 216, 217, 218, 219, 411/220, 271, 321, 323, 325, 333, 334, 15, 75, 76, 77, 411/78, 79, 80

[56] References Cited

U.S. PATENT DOCUMENTS

| 850,801 | 4/1907 | Smith | 411/271 |
|---|---|---|---|
| 1,022,261 | 4/1912 | Rasmussen | 411/76 |
| 2,729,260 | 1/1956 | Matson | 411/321 X |
| 2,871,749 | 2/1959 | Kalb | 411/57 |
| 3,022,701 | 2/1962 | Potruch . | |
| 3,188,905 | 6/1965 | Millet | 411/57 |
| 3,198,058 | 8/1965 | Barry . | |
| 3,234,842 | 2/1966 | Sauter | 411/57 |
| 3,279,301 | 10/1966 | Fischer | 411/60 X |
| 3,461,772 | 8/1969 | Barry . | |
| 3,765,295 | 10/1973 | Ptak . | |
| 3,832,931 | 9/1974 | Talan . | |
| 3,921,496 | 11/1975 | Helderman . | |
| 3,937,122 | 2/1976 | Riedel . | |
| 4,013,071 | 3/1979 | Rosenberg | 128/92 B |

FOREIGN PATENT DOCUMENTS

| 2602283 | 7/1977 | Fed. Rep. of Germany | 411/60 |
|---|---|---|---|
| 186856 | 10/1922 | United Kingdom | 411/271 |
| 438873 | 11/1935 | United Kingdom | 411/57 |
| 1076504 | 7/1967 | United Kingdom | 411/41 |
| 1434183 | 5/1976 | United Kingdom | 411/41 |

Primary Examiner—Thomas J. Holko
Attorney, Agent, or Firm—Biebel, French & Nauman

[57] ABSTRACT

A tamper-proof fastener consists of a screw body having a flat-faced head portion and a threaded shank portion having at least one slit extending in a radial direction and located in an end of the shank opposite the head portion, the slit forming at least two legs in the end of the shank. The body defines a central bore extending from the flat face of the head portion to a point intersecting the slit at the end of the shank portion to form a squared-off shoulder in at least one of the legs and terminating in a tapered shoulder in at least one other leg. The tamper-proof screw also includes a headless pin which is sized to fit within the bore so that insertion of the pin into the bore causes an end of the pin to abut the squared-off shoulder and to engage the tapered shoulder to deflect the other leg outwardly. The pin is sized to be flush with the face of the head portion when it abuts the squared-off shoulder to eliminate a protrusion which could be grasped to remove the fastener.

8 Claims, 6 Drawing Figures

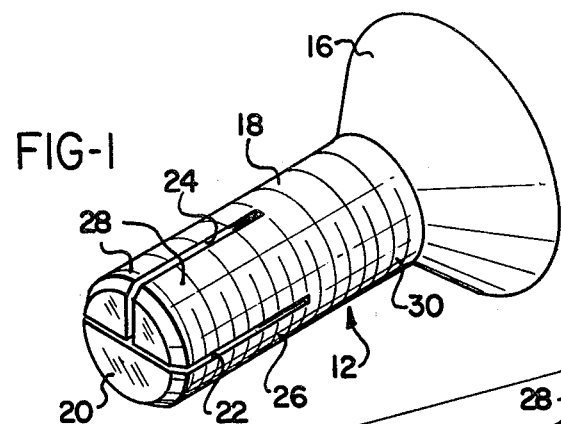
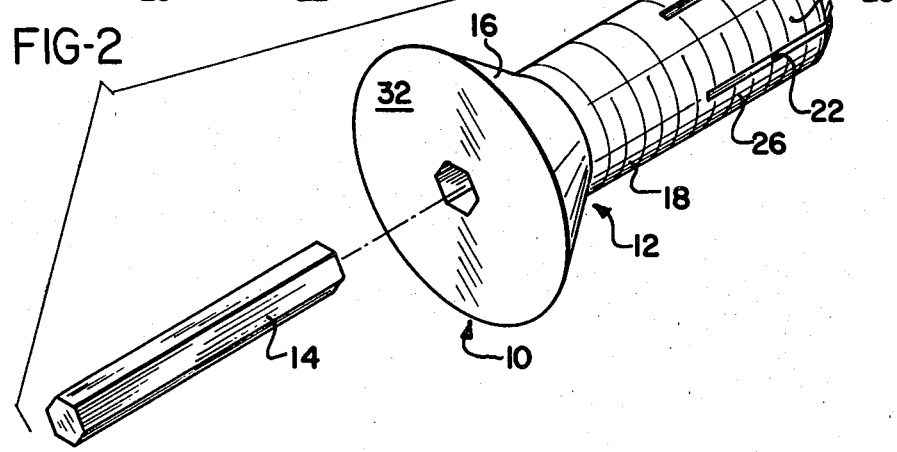
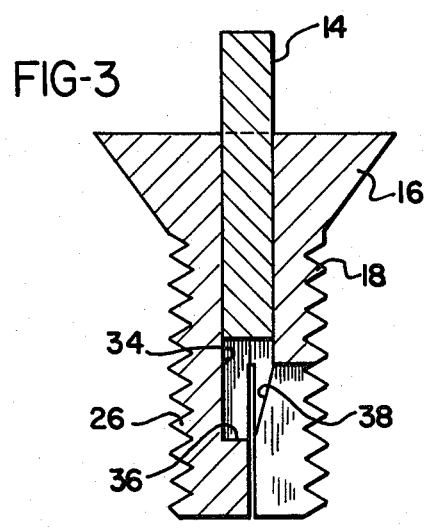
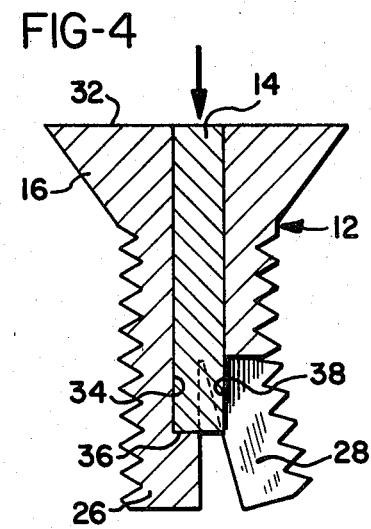

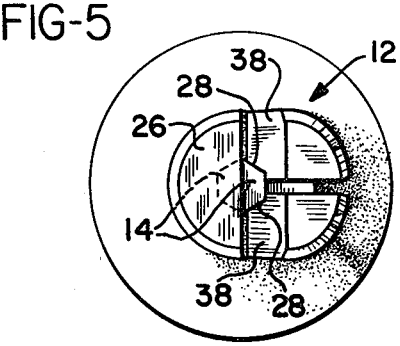
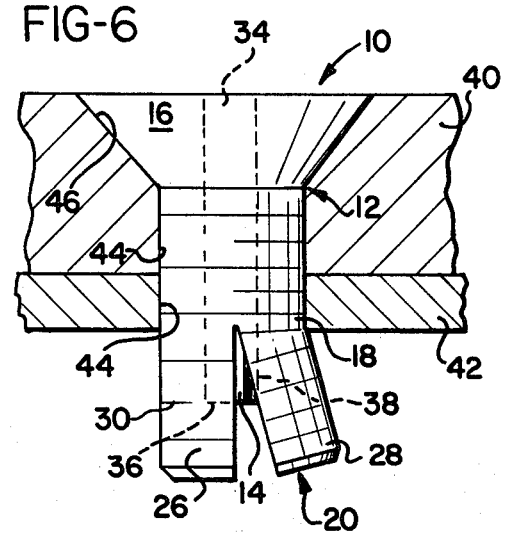

TAMPER-PROOF FASTENER

BACKGROUND OF THE INVENTION

1. Field of the Invention

The present invention relates to fasteners and, in particular, to fasteners having a body which, when inserted into a workpiece, is deformed by the addition of a second member, thereby preventing its removal from the workpiece.

2. Prior Art

To join a workpiece such as a placard or sign to a second workpiece such as a wall, or to join two planar workpieces together, it is well-known to utilize a blind rivet as a fastener. For example, U.S. Pat. No. 3,198,058 discloses a blind rivet consisting of a body having a flared head which forms a flange to clamp workpieces together, a split shank, and a central bore which intersects the split shank. The rivet also includes a pin having a slightly flared head and a chamfered tip.

The body is inserted into predrilled pilot holes in the workpieces until the flanged head abuts the face of one of the workpieces. The pin is driven into the bore until the slightly flared head of the pin abuts a mating countersink in the bore. The chamfered tip of the pin engages sloping shoulders formed in the split end of the body and forces the ends apart, thus clamping the workpieces between the split ends and the flanged head of the body.

The pin includes a flange extending about its periphery and located about midway along its length which prevents the pin from being removed from the bore of the rivet. However, the rivet can be removed from the workpieces simply by driving the pin entirely through the bore of the rivet and out the other side of the workpieces. The body of the rivet then can be removed from the holes.

Other types of rivets include bodies having barbed or threaded exteriors on their shanks to prevent removal of the rivets once mounted. For example, U.S. Pat. No. 3,461,772 discloses a plastic rivet having a shank with a series of barbs on its external periphery. The body of the rivet includes a flared, flat-faced head and the body of the rivet is inserted into a predrilled countersunk pilot hole so that the flat-faced head is flush with the surface of the workpiece. A pin having a series of external ridges and a slightly flared head is inserted into a central bore, thereby driving the body of the plastic rivet apart so that the barbs engage the sides of the predrilled hole. The body includes a longitudinal slit which extends transversely across the shank so that the shank terminates in a pair of legs which can be driven apart from each other by the pin into the walls of the hole.

Other types of fasteners are of the anchor-type. For example, U.S. Pat. Nos. 3,937,122 and 3,022,701 disclose anchors having bodies with ribbed or threaded shanks and central bores sized to receive a pin which includes external threads. In each of these patents, the pin itself has a slotted head so that it may be inserted or removed by the use of a screwdriver.

In many applications, it is desirable to utilize a blind rivet or anchor which will permanently join the workpieces together or become permanently embedded in a single workpiece. For example, such an application may involve the mounting of a street sign or other directional sign to a building or other support so that it may not be removed or vandalized. Another area of usage would occur in correctional facilities or jails where it is desirable permanently to mount protective screens over windows and other openings to prevent the escape of the individuals detained in the facility.

A disadvantage of the aforementioned fasteners and anchors is that it is relatively easy to remove the pin from the body of the anchor or rivet, then remove the rivet itself from the hole within which it is mounted. Removal of the anchor or rivet is especially easy if a portion of the rivet body and/or pin extends above the surface of the workpiece within which it is mounted. Similarly, if the central pin includes a slot to receive the beads of a screwdriver, it is relatively easy to unscrew the pin from the body of the rivet or anchor and then remove the anchor.

Those anchors or rivets which have heads that do not protrude a great distance from the surface of the workpiece, or in which the pin does not contain a slot head or does not protrude from the surface of the workpiece or body of the rivet, may still be easily removable and therefore undesirable for use in such security environments. With this latter type of fastener, the pin may often be removable by driving it completely through the body of the fastener and out the other side of the workpiece. It is then a simple matter to remove the body of the fastener from the hole in the workpiece.

Accordingly, there is a need for a fastener which may be used in high-security areas or to mount signs so that they may not be removed or vandalized which can provide a permanent and tamper-proof means of mounting. There is a need for a fastener which does not require a flanged head which protrudes outward from the surface of the workpiece and thus presents a vulnerable portion of the fastener; and a tamper-proof fastener in which the central pin cannot be removed, unscrewed, or driven through the fastener to the other side of the workpiece. Such a fastener must also be relatively inexpensive to manufacture and must have a simple design which lends itself to mass fabrication. Furthermore, such a fastener must be relatively easy to install and not require expensive power tools to secure the fastener to the workpiece.

SUMMARY OF THE INVENTION

The present invention provides a fastener which is capable of securing a number of workpieces together and yet may be flush mounted to the front workpiece to present a flat, unbroken surface which resists tampering. The present invention has great versatility in that it may be used to secure hard workpieces such as metallic plates together, provided the shank of the invention is of the appropriate size, or it may be utilized to bind relatively soft wooden or plastic workpieces together. The invention may also bind hard and soft pieces together.

In addition, the fastener of the present invention includes a pin which is held by the body of the fastener such that the pin may not be pulled outwardly from the workpiece, nor driven inwardly and out the other side of the workpiece within which the fastener is mounted.

The present invention includes a screw body having a head portion and a threaded shank portion, a central bore extending through the screw body, and a pin sized to fit within the central bore. The shank includes three radially extending slits formed in an end opposite the head portion. Two slits preferably are coplanar and extend along a common diameter, and the third slit extends along a radius and is normal to the first two. The slits form three legs in the screw body.

The central bore extends from the head portion and intersects the three slits in the end of the shank portion. The central bore forms a squared-off shoulder in a first or major semi-cylindrical shaped leg, and forms tapered shoulders in the other two minor legs. The squared-off shoulder provides a stop for the pin to prevent it from being driven completely through the screw body, and the tapered shoulders of the other two legs act as bearing surfaces which are contacted by the end of the pin and forcing the minor shoulders outward as the pin is inserted into the bore and is driven to the squared-off shoulder.

The pin and central bore of the present invention are polygonal in cross section, and preferably are hexagonal. Thus, once the pilot hole has been drilled and countersunk, an allen wrench or other hex-headed tool may be inserted into the bore at the head portion and twisted to drive the screw body into the hole. The hole preferably should be sized so that the external threads of the shank bite into the edges of the hole and thread the screw body into the hole.

The head portion of the screw body is shaped like the head of a wood screw; that is, it has a flat face and a conical side that tapers to the shank. Thus, when the screw body is threaded into the pilot hole, the head portion will fit flush with the surface of the workpiece and will not provide a protruding portion which could be grasped and pulled to remove the screw from the workpieces. The pin preferably is sized so that it is flush with the flat face of the head portion when it abuts the squared-off shoulder of the shank so that it does not present a protruding portion which may be grasped or pounded to remove the fastener.

The fastener of the present invention is used as follows. First, a hole is drilled in the workpiece or workpieces to be joined together; the hole is given a conical countersink shaped to matingly engage the head portion of the screw body. The screw body is inserted into the hole and an allen wrench or other similar device is inserted into the hexagonal bore of the body to thread the body into the hole. If the workpieces to be joined are made of steel or other hard material, it is essential that the shank of the screw body be of sufficient length so that a portion of the slitted end of the shank protrudes beyond the back of the last workpiece. The screw body is threaded into the hole until the flat head is flush with the surface of the front workpiece. An advantage of the invention is that the external threads of the shank grip the workpieces and hold them in a joined configuration until the pin is inserted.

To set the pin, the end of the pin is first inserted into the opening of the bore and a hammer or other instrument is used to drive the pin along the bore until the end abuts the squared-off shoulder. As the pin approaches the end of the bore, the end of the pin encounters the tapered shoulders of the minor legs and begins to drive the minor legs outward away from the bore. The divergent position of the legs serves to clamp the workpieces between the legs and the flared head portion. Thus, the workpieces are held in position not only by the threaded shank but by the clamping action of the flared head and legs as well. The fastener of the present invention cannot be pulled out of its hole since there is nothing protruding from the surface of the front workpiece which can be grasped by a tool or by the hands. In addition, the pin cannot be driven through the screw body since it is abutting a semi-circular squared-off shoulder formed in the first leg.

The screw body having a threaded shank is a preferred embodiment of the invention. An alternate embodiment having a smooth, non-threaded shank may be used without departing from the concept of the invention. With a fastener having a smooth shank, the entire binding force of the fastener would be the clamping action of the conical head and diverted minor legs.

The screw body of the fastener of the present invention may be made of aluminum, brass, bronze, stainless steel or other types of steel, depending upon the intended use and the type of material comprising the workpieces. If the workpieces are comprised of wood, plastic or other soft material, the screw body may be made of plastic or nylon. The pin preferably is made of a hardened steel or stainless steel and is sufficiently strong so that it will not deform while being driven into the bore or shatter under the blows of a hammer during the driving process.

The pin preferably is sized to be inserted relatively easily into the central bore until it encounters the tapered shoulders of the minor legs. Hence, there is no need for an interference fit between the pin and the bore of the screw body other than in the area of the minor legs. Preferably, the tapered shoulders of the second and third legs form an angle with a central axis of approximately 15 degrees. However, the slope of the tapered shoulders may vary depending upon the material comprising the workpieces in which the fastener is inserted.

The tamper-proof fastener of the present invention is ideally suited for use in areas where security or vandalism is a problem. Once the workpieces have been joined and the pin inserted, the head of the fastener is flush with the surface of the outer workpiece and does not present a protrusion which can be grasped in an attempt to remove the fastener. Assuming one could grasp the head, the flared leg of the shank would make extraction of the fastener extremely difficult.

Another use of the fastener is in the aircraft industry. The positive locking action would prevent the fastener from vibrating loose after installation, thus making an ideal rivet for use in aircraft construction.

It should be noted that the presence of a hollow central bore does not weaken the fastener substantially. Most of the load-bearing material of the shank is intact since the stress level at the surface of the shank may be five to six times the stress at the core, under tension loads alone.

Accordingly, it is an object of the present invention to provide a tamper-proof fastener which, when inserted, does not protrude from the front workpiece; a fastener that may be installed quickly and does not require power tools or specially designed tools for insertion; a fastener which has a relatively uncomplicated design and faciliates mass production; and a fastener which may be mounted in a variety of materials.

Other objects and advantages of the invention will be apparent from the following description, the accompanying drawings and the appended claims.

BRIEF DESCRIPTION OF THE DRAWINGS

FIG. 1 is a perspective view of a fastener of the present invention showing the shank portion of the screw body;

FIG. 2 is an exploded perspective view of the fastener of FIG. 1 showing the head portion and the pin;

FIG. 3 is a view of the fastener of FIG. 1 in section, showing the pin partially inserted in the central bore;

FIG. 4 is a view of the fastener of FIG. 3 in section, showing the pin inserted completely into the central bore and abutting the squared-off shoulder;

FIG. 5 is an end view of the fastener of FIG. 4 showing the legs spread apart by the pin; and FIG. 6 is a view of the fastener of the present invention joining two workpieces together.

DETAILED DESCRIPTION OF THE PREFERRED EMBODIMENT

As shown in FIGS. 1 and 2, the tamper-proof fastener of the present invention, generally designated 10, consists of a screw body 12 and a pin 14. The screw body 12 includes a conical head portion 16 and a cylindrical shank portion 18.

The shank portion 18 of the screw body 12 terminates in a chamfered end 20 and includes a major slit 22 and a minor slit 24 extending from the chamfered end toward the head portion 16. Preferably, the major slit 22 extends across the body of the shank portion 18 at a diameter of the shank, and the minor slit 24 is oriented normal to the major slit and lies along a radius of the shank. The major slit 22 defines a major leg 26 and the major slit 22 and minor slit 24 define two minor legs 28. The shank portion preferably includes screw threads 30 on its outer surface.

The head portion 16 is generally conical in shape and includes flat face 32. The flat face 32 defines an opening to a central bore 34 which extends from the head portion 16 through the shank portion 18 to intersect the major and minor slits 22, 24 (FIG. 3). The central bore 34 preferably is hexagonal in cross section so that it may receive an allen wrench or other hex-shaped tool to facilitate insertion in a workpiece.

As shown in FIG. 3, the central bore 34 extends partially through the major leg 26 and terminates in a squared-off shoulder 36. The squared-off shoulder 36 preferably forms a surface which is normal to the sides of the central bore 34. The central bore 34 extends partially through the minor legs 28 and terminates at a depth which corresponds to the squared-off shoulder 36 formed in the major leg 26. The wall of the central bore 34 in each of the minor legs 28 is formed as a tapered shoulder 38. Thus, the central bore 34 tapers at one side thereof as it passes within the major and minor legs 26, 28. The tapering of the tapered shoulders 38 preferably begins at a point which approximates the point of first intersection of the central bore 34 and the major and minor slits 22, 24. The slope of the tapered shoulders 38 with respect to the walls of the bore 34 is preferably approximately 15 degrees.

As shown in FIGS. 3 and 4, the central bore 34 is sized to receive the pin 14. Preferably, the pin 14 has a hexagonal shape in cross section which complements the contour of the bore 34. The pin 14 is sized so that its length equals the distance from the flat face 32 of the head portion 16 to the squared-off shoulder 36 of the major leg 26.

The interaction of the pin 14 and screw body 12 is best shown in FIGS. 3, 4, and 5. As the pin 14 is driven along the bore 34 of the screw body 12, it engages the tapered shoulders 38 of the minor legs 28. The wedging action of the pin 14 as it continues to be driven within the bore 34 causes the minor legs 28 to be deflected outward (FIGS. 4 and 5). Once the pin 14 has abutted the squared-off shoulder 36 of major leg 26, movement of the pin within the screw body 12 ceases.

An application of the fastener 10 is best shown in FIG. 6. In order to fasten workpieces 40, 42 together, a hole 44 which approximates the size of the shank portion 18 is first drilled through the workpieces 40, 42. It is understood that any number of workpieces may be used, provided the rearmost workpiece can be gripped by legs 26, 28. It is preferable that the hole 44 be sized such that the threads 30 are able to bite into the surface of the hole as the screw body 12 is inserted. The hole 44 is then countersunk to form a conical recess 46 to receive the head portion 16 of the fastener 10.

After the hole 44 has been drilled and countersunk, the fastener 10, without the pin 14 inserted, is placed within the hole and an allan wrench or other hex-headed tool (not shown) is inserted into the central bore 34. The screw body 12 may now be threaded into the hole 44 in a manner similar to inserting a conventional screw. Once the head portion 16 has engaged the countersink 46, the workpieces 40, 42 are held together by the threads 30 of the shank portion 18.

The pin 14 may now be inserted in the bore 34 and driven through the bore until the end of the pin abuts the squared-off shoulder 36 of the major leg 26. As the pin engages the tapered shoulders 38 of the minor legs 28, they are deflected outward, thereby flaring the end 20 of the shank portion 18. Once the pin 14 has been inserted into the fastener body 12 and the body assumes the configuration shown in FIG. 6, the fastener 10 cannot be removed from the hole 44 since the flared end 20 of the shank portion 18 can no longer pass through the hole. The pin may not be removed from the bore 34 since there is no portion of the pin protruding from the flat face 32 of the head portion which can be gripped. The pin 14 cannot be driven through the body 12 since it abuts the squared-off shoulder 36. The workpieces 40, 42 are now permanently joined together.

The arrangement shown in FIG. 6 would be most appropriate if the workpieces 40, 42 were made of a hard material such as steel or masonry. However, if the workpieces to be joined were of a softer compressible material such as wood or plastic, the major and minor legs need not protrude from the rear of the back workpiece. Instead, the end of the shank portion may be positioned within the rearmost workpiece and subsequent expansion of the minor legs would compress the material of the back workpiece. The fastener would still provide a permanent bond between the workpieces.

While the form of apparatus herein described constitutes a preferred embodiment of this invention, it is to be understood that the invention is not limited to this precise form of apparatus and that changes may be made therein without departing from the scope of the invention.

What is claimed is:

1. A tamper-proof fastener comprising:
   a body having a head portion and a shank portion, said shank portion having at least one slit extending along a radius and located in an end of said shank opposite said head portion, said slit forming at least two legs in said end;
   said body defining a central bore extending from said head portion and terminating proximate said end such that it intersects said slit at said legs;
   said central bore terminating in a squared-off shoulder proximate said end in at least one of said legs;

said central bore terminating in a tapered shoulder proximate said end in at least one other of said legs;

a headless pin sized to fit within said bore such that insertion of said pin into said bore causes an end of said pin to abut said squared-off shoulder and to engage said tapered shoulder thereby deflecting outwardly said other leg adjacent said end of said shank; and said squared-off shoulder being sized to prevent displacement of said pin therepast when said other leg is deflected outwardly.

2. The tamper-proof fastener of claim 1 wherein said pin is sized such that an opposite end is flush with said head portion when said end abuts said squared-off shoulder.

3. The tamper-proof fastener of claim 2 wherein said head portion includes a flat face and an exterior surface converging toward said shank portion.

4. The tamper-proof fastener of claim 2 wherein said shank portion includes three of said radially extending slits, a first and a second slit being substantially coplanar to each other, and a third slit being normal to said first and second slits; said slits forming three of said legs, a first leg being of substantially semi-cylindrical shape and including said squared-off shoulder, and second and third legs, each having one of said tapered shoulders.

5. The tamper-proof fastener of claims 1 or 4 wherein said bore and said pin have complementary polygonal shapes in cross section.

6. The tamper-proof fastener of claim 5 wherein said polygonal shape is a hexagon.

7. The tamper-proof fastener of claim 6 further comprising threads formed on an exterior surface of said shank portion.

8. A tamper-proof fastener comprising:

a body having a head portion and a shank portion, said shank portion including first and second radially extending coplanar slits and a third radially extending slit normal thereto, said slits forming a first leg having a substantially semi-cylindrical shape, and second and third legs, said legs located at an end of said shank opoosite said head portion;

said body having a central bore extending from said head portion terminating proximate said end of said shank and intersecting said slits at said legs to form a squared-off shoulder in said first leg and tapered shoulders in said second and third legs;

said head portion including a flat face and an exterior surface converging toward said shank portion; and a headless pin sized to fit within said bore such that insertion of said pin into said bore causes an end of said pin to abut said squared-off shoulder and to engage said tapered shoulder thereby deflecting outward said other leg, and an opposite end thereof is flush with said flat face.

* * * * *